H. H. THALE.
BEE CULTURE APPARATUS.
APPLICATION FILED NOV. 24, 1913.
1,108,277.
Patented Aug. 25, 1914.
2 SHEETS—SHEET 2.
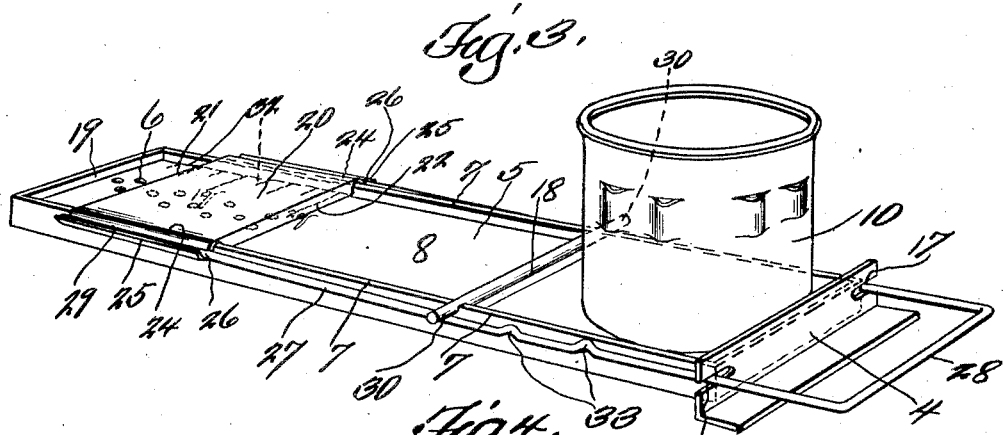
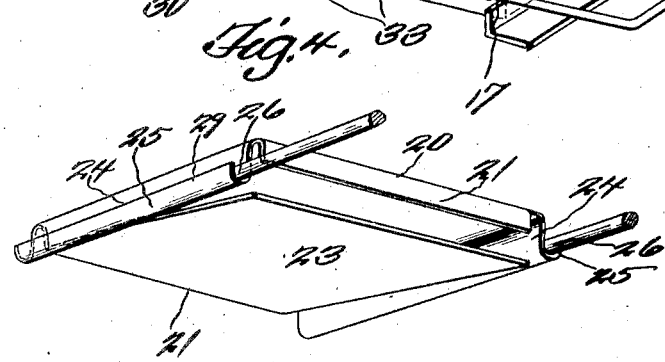
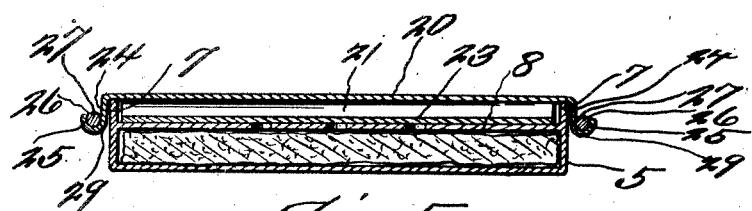
Witnesses
A. R. Wolfe
Inventor
Harry H. Thale,
By D. Swift & Co.,
Attorneys

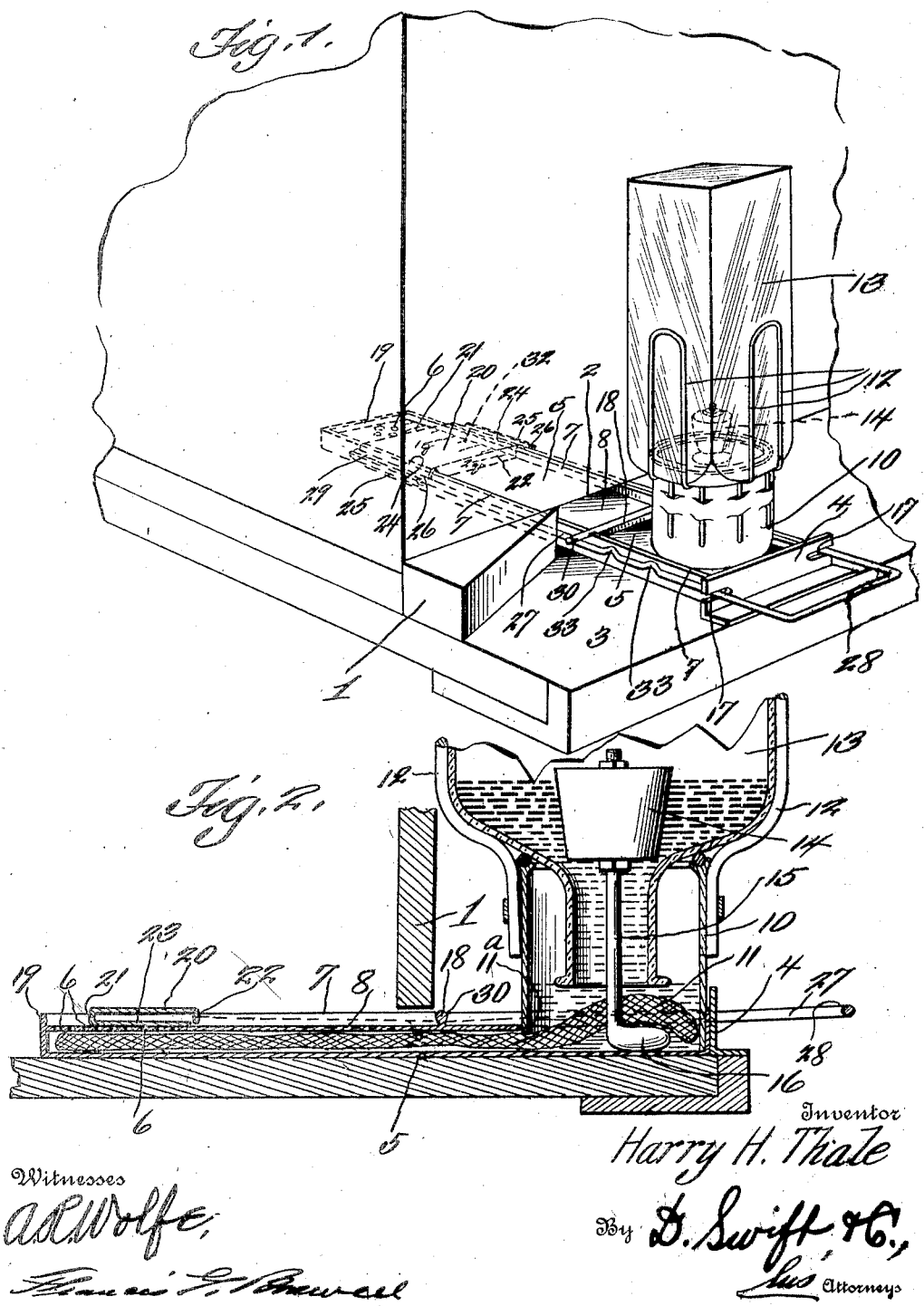

UNITED STATES PATENT OFFICE.

HARRY H. THALE, OF MAYWOOD, MISSOURI.

BEE-CULTURE APPARATUS.

1,108,277.

Specification of Letters Patent.

Patented Aug. 25, 1914.

Application filed November 24, 1913. Serial No. 802,730.

*To all whom it may concern:*

Be it known that I, HARRY H. THALE, a citizen of the United States, residing at Maywood, in the county of Lewis and State of Missouri, have invented a new and useful Bee-Culture Apparatus; and I do hereby declare the following to be a full, clear, and exact description of the invention, such as will enable others skilled in the art to which it appertains to make and use the same.

This invention relates to the art of bee culture, and more particularly to a new and useful feeder for bee hives.

An object of the invention is the provision of an automatic feeder of such a construction that the feed or syrup may be regulated in different quantities, and in any desired length of time. For instance, a half pint, a pint, or quart, or three pints, or a half gallon, or all the feed may be fed in twelve or twenty-four hours, or in any other desired length of time.

Another object of the invention is to improve the structure of the feeder, shown, described and claimed in the application filed September 17, 1913, Serial No. 790,237.

One of the features of the invention is the provision of an elongated substantially flat hollow member having perforations in its upper face at one end, and a bottle holder at the other end. The feed is allowed to pass from the bottle into the hollow member, and ooze up through said perforations where it is consumed by the bees in the hive, there being a slide for covering certain of said apertures or perforations, the slide adapted to be set with relation to the graduation, whereby different quantities of feed may be fed in different periods of time.

In practical fields the details of construction may be subjected to alterations, falling within the scope of what is claimed.

The invention comprises further features and combination of parts, as hereinafter set forth, shown in the drawings and claimed.

In the drawings:—Figure 1 is a perspective view of a bee hive showing an improved feed apparatus as applied thereto. Fig. 2 is an enlarged detail sectional view. Fig. 3 is a detail perspective view of the feeder apparatus removed. Fig. 4 is a detail view of the slide detached. Fig. 5 is a transverse sectional view through the feed apparatus adjacent the slide 20 and through the same.

Referring more particularly to the drawings, 1 designates the usual form of bee hive having an entrance opening 2 at the base thereof for the bees. The forward portion of the base of the hive is provided with a platform 3, on which the angular plate 4 of the elongated substantially flat hollow member 5 rests or engages, the member 5 extending through the entrance opening, and in upon the interior of the hive. The upper face of the member 5 at one end thereof is provided with a series of perforations 6 upwardly through which the feed, such as syrup oozes. The hollow member 5 is provided with a flange 7 rising above the upper surface of the upper plate 8 of the hollow member. This flange is high enough to prevent the syrup from running over and spreading on the floor of the interior of the hive. Rising upwardly from the other end of the top plate 8 is a syrup cup 10, in which any suitable wick 11 is arranged, whereby the feed may be fed into the hollow portion of the member 5 through the opening 11$^a$. Extending vertically from the syrup cup is a series of U-shaped wire arms 12, so arranged as to support a bottle rectangular in contour in cross section, or other suitable receptacle 13 in an upright position, and inverted. This bottle is designed to contain the syrup or other suitable feed, and is provided with a valve member 14 having a stem 15, at the lower end of which a weight 16 is provided.

When arranging the bottle in an inverted position, the stem particularly the weight thereof engages the bottom of the syrup cup, in order to unseat the valve member, so as to allow the feed to flow into the hollow portion of the member 5. However, before placing the bottle or other receptacle in this vertical position in the syrup cup, the weight at the lower end of the stem of the valve member acts to hold the valve member closed. Each end of the angular plate 4 is provided with a slot 17. Spaced apart from the syrup cup a short distance is a flange 18, between which and the end flange 19 of the hollow member a slide is adjustably mounted. This slide 20 is constructed from a piece of sheet metal having forward and rear downwardly extending flanges 21 and 22 to slide against the upper surface of the top plate 8 of the member 5. However, the forward flange 21 is provided with a rearwardly extending part 23, adapted to cover the perforations 6, when the slide is moved forwardly, so as to cut off the supply of syrup or other feed through some or all of the perforations. The opposite sides of the slide are constructed with flanges 24, extending over and down adjacent the flanges 7, and rolled upwardly forming extension flanges 25, to which the ends 26 of the guide rods 27 of the member 28 are attached, in any suitable manner, as by soldering or otherwise, as shown at 29. These guide rods engage under the lugs 30, and owing to the guide rods so engaging said lugs and by virtue of the resiliency of the guide rods the slide, and especially the rearwardly extending part 23 of the flange 21 is in close contact with the upper surface of the top plate 8 of the member 5. These guide rods also engage the slots 17 of the plate 4, and between where the guide rods engage said slots 17 and the slide, said guide rods are slightly sprung downwardly, owing to their engagement under said lugs to insure resiliency. One of the guide rods is provided with a series of lugs 33 or raised portions which engage or coöperate with the plate 4 for holding the guide rods and the slides in adjusted positions. One of the side flanges 7 or both have graduations 32, arranging from a pint to two quarts, and with relation to which the slide may be adjusted.

The invention having been set forth, what is claimed as new and useful is:—

1. A feeder for bee hives comprising a hollow elongated member, the upper plate of which at one end being provided with perforations and the surrounding flange, a slide having a yielding flange adapted to coöperate with said perforations for controlling the feed, guide rods and guides therefor so constructed and arranged as to coöperate yieldably with the slide to hold the yielding flange in the slide in close contact with the upper surface of the upper wall of said hollow member, and means for holding the guide rods and the slide in adjusted positions.

2. A feeder for bee hives comprising a hollow elongated member, the upper plate of which at one end being provided with perforations and the surrounding flange, a slide having a yielding flange adapted to coöperate with said perforations for controlling the feed, guide rods and guides therefor so constructed and arranged as to coöperate yieldably with the slide to hold the yielding flange in the slide in close contact with the upper surface of the upper wall of said hollow member, and a syrup cup including a feed receptacle for the hollow member.

3. A feeder for a bee hive comprising an elongated hollow member, the upper plate of which at one end being provided with a series of perforations and a surrounding flange, a slide guided upon the surrounding flange, said slide having a rearwardly extending yieldable flange to coöperate with said perforations to control the flow of the feed, one end of the hollow member having a plate having slots in its ends, lugs projecting laterally from the hollow member, guide rods engaging the slots of the plate and under said lugs and attached to the slide to hold the same and the yielding flange thereof closely in contact with the upper plate of the hollow member, and a feeding receptacle for the hollow member.

4. A feeder for a bee hive comprising an elongated hollow member, the upper plate of which at one end being provided with a series of perforations and a surrounding flange, a slide guided upon the surrounding flange, said slide having a rearwardly extending yieldable flange to coöperate with said perforations to control the flow of the feed, one end of the hollow member having a plate having slots in its ends, lugs projecting laterally from the hollow member, guide rods engaging the slots of the plate and under said lugs and attached to the slide to hold the same and the yielding flange thereof closely in contact with the upper plate of the hollow member, devices upon one of the guide rods to hold the same and the slides in different adjusted positions, a syrup cup at one end of the hollow member having spring arms, and a feed receptacle including a valve member supported in the syrup cup by said arm.

In testimony whereof I have signed my name to this specification in the presence of two subscribing witnesses.

HARRY H. THALE.

Witnesses:
CHARLES F. CLARENCE,
O. E. CASON.